(12) United States Patent
Horie

(10) Patent No.: US 7,111,032 B2
(45) Date of Patent: Sep. 19, 2006

(54) RESIDUE COMPUTING DEVICE

(75) Inventor: Kimito Horie, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 619 days.

(21) Appl. No.: 10/235,541

(22) Filed: Sep. 6, 2002

(65) Prior Publication Data

US 2003/0182340 A1    Sep. 25, 2003

(30) Foreign Application Priority Data

Mar. 19, 2002   (JP)   ............... 2002-076413

(51) Int. Cl.
*G06F 7/72*    (2006.01)
(52) U.S. Cl. ...................... 708/491; 708/492
(58) Field of Classification Search ............ 708/491, 708/492
See application file for complete search history.

(56) References Cited

U.S. PATENT DOCUMENTS 6,321,247 B1 *  11/2001 Matthews et al. .......... 708/491

2003/0033340 A1 *  2/2003 Asami ...................... 708/491

FOREIGN PATENT DOCUMENTS

JP   11-212951   8/1999
JP   2002-007112   1/2002

* cited by examiner

*Primary Examiner*—D. H. Malzahn
(74) *Attorney, Agent, or Firm*—VolentineFrancos&Whitt PLLC

(57) ABSTRACT

A residue computing device on a Galois Field, for calculating a residue of a product of a multiplier factor and a multiplicand under a modulo, includes a gate for allowing the multiplier factor to pass therethrough when a leading bit of the multiplicand is 1, an adder for adding a temporary residue and a value obtained by the passage, a gate for allowing the modulo to pass therethrough when a leading bit of a summed value of the adder is 1, and a subtractor for subtracting the modulo from the summed value of the adder when the leading bit of the summed value is 1, wherein a process for setting a value obtained by shifting a subtracted value of the subtractor by one bit, as the temporary residue on the basis of the next clock is repeatedly performed for each clock to thereby calculate the residue.

9 Claims, 10 Drawing Sheets

```
  0 0 0 0 0 0                               0 0 0 1 1 0  (QUOTIENT)
    0 0 1 0 1 1      1 0 0 1 0 1  ⟋0 0 0 1 1 0 0 1 1 1 1
      0 0 1 0 1 1                 −0 0 0 0 0 0
        0 0 1 0 1 1                 0 0 1 1 0 0
          0 0 0 0 0 0               −0 0 0 0 0 0
+           0 0 1 0 1 1               0 1 1 0 0 1
─────────────────────                 −0 0 0 0 0 0
0 0 0 1 1 0 0 1 1 1 1  (PRODUCT)        1 1 0 0 1 1
                                       −1 0 0 1 0 1
                                         1 0 1 1 0 1
                                        −1 0 0 1 0 1
                                           0 1 0 0 0 1
                                          −0 0 0 0 0 0
                                           0 1 0 0 0 1  (RESIDUE)
```

Fig. 2

| | Y (MSB) | SUM | R |
|---|---|---|---|
| ① | 0 | 0\|0 0 0 0 0 | 0 0 0 0 0 0 |
| ② | 1 | 0\|0 1 0 1 1 | 0 0 1 0 1 1 |
| ③ | 1 | 0\|1 1 1 0 1 | 0 1 1 1 0 1 |
| ④ | 1 | 1\|1 0 0 0 1 | 0 1 0 1 0 0 |
| ⑤ | 0 | 1\|0 1 0 0 0 | 0 0 1 1 0 1 |
| ⑥ | 1 | 0\|1 0 0 0 1 | 0 1 0 0 0 1 |

Row of SUM (MSB) shows QUOTIENT    RESIDUE

Fig. 3

| $T^k \cdot X$ | RESIDUE(mod Z) |
|---|---|
| $1 \cdot X$ | 0 1 0 1 1 |
| $T \cdot X$ | 1 0 1 1 0 |
| $T^2 \cdot X$ | 0 1 0 0 1 |
| $T^3 \cdot X$ | 1 0 0 1 0 |
| $T^4 \cdot X$ | 0 0 0 0 1 |

| n | RESIDUE (mod Z) | n | RESIDUE (mod Z) | n | RESIDUE (mod Z) |
|---|---|---|---|---|---|
| 0 | 0 0 0 0 1 | 11 | 0 0 0 1 1 | 22 | 0 0 1 0 1 |
| 1 | 0 1 0 1 1 | 12 | 1 1 1 0 1 | 23 | 0 0 0 1 0 |
| 2 | 0 1 1 1 1 | 13 | 1 0 0 0 1 | 24 | 1 0 1 1 0 |
| 3 | 0 0 1 1 0 | 14 | 0 1 0 1 0 | 25 | 1 1 1 1 0 |
| 4 | 1 1 1 1 1 | 15 | 0 0 1 0 0 | 26 | 0 1 1 0 0 |
| 5 | 0 0 1 1 1 | 16 | 0 1 0 0 1 | 27 | 1 1 0 1 1 |
| 6 | 1 0 1 0 0 | 17 | 1 1 0 0 1 | 28 | 0 1 1 1 0 |
| 7 | 0 1 0 0 0 | 18 | 1 1 0 0 0 | 29 | 0 1 1 0 1 |
| 8 | 1 0 0 1 0 | 19 | 1 0 0 1 1 | 30 | 1 0 0 0 0 |
| 9 | 1 0 1 1 1 | 20 | 1 1 1 0 0 | 31 | 0 0 0 0 1 |
| 10 | 1 0 1 0 1 | 21 | 1 1 0 1 0 | | |

INVERSE RESIDUE

Fig.7

| SUM | BN0 | BN1 | MODE |
|---|---|---|---|
| SUM<Z/2 | 0 | 0 | ① |
| Z/2≦SUM<Z | 0 | 1 | ② |
| Z≦SUM<3Z/2 | 1 | 0 | ③ |
| 3Z/2≦SUM<2Z | 1 | 1 | ④ |

Fig.10

| No. of clock | Y msb | R' | SUM0 | R | SB0 | SB1 |
|---|---|---|---|---|---|---|
| 0 | 0 | 0 | 0 | 0 | 0 | 0 |
| 1 | 1 | 0 | 17 | 17 | 0 | 0 |
| 2 | 1 | 34 | 51 | 14 | 1 | 0 |
| 3 | 0 | 28 | 28 | 28 | 0 | 1 |
| 4 | 1 | 19 | 36 | 36 | 0 | 1 |
| 5 | 1 | 35 | 52 | 15 | 1 | x | x : Don't Care

RESIDUE

Fig.11

| BN2 BN1 BN0 | SUM | TEMPORARY RESIDUE | MODE | QUOTIENT |
|---|---|---|---|---|
| 0 0 0 | SUM<Z/2 | 2·SUM | ① | 0 |
| 0 0 1 | Z/2≦SUM<Z | 2·SUM-Z | ② | Z/2 |
| 0 1 0 | — | — | — | — |
| 0 1 1 | Z≦SUM<3Z/2 | 2·SUM-2·Z | ③ | Z |
| 1 0 0 | — | — | — | — |
| 1 0 1 | — | — | — | — |
| 1 1 0 | — | — | — | — |
| 1 1 1 | 3Z/2≦SUM<2Z | 2·SUM-3·Z | ④ | 3Z/2 |

RESIDUE COMPUTING DEVICE

BACKGROUND OF THE INVENTION

The present invention relates to a residue computing device on a Galois Field, which is most suitable for a residue arithmetic operation and a power-residue arithmetic operation used in elliptic curve cryptography, etc.

While arithmetic operations defined in elliptic curves on an affine space can provide efficient calculations with a microcomputer or the like when the arithmetic operations form a group, particularly, a finite field (Galois Field) is taken by reside arithmetic operations, their calculations result in enormous amounts. Therefore, applications to cryptographs had been considered in the 1980s. It has been found that this type of elliptic curve cryptosystem is capable of implementing security of the same degree with a key having a shorter bit length as compared with the conventional DSA system or RSA system. Attention has thus been given to this point of view in recent years. For example, an elliptic curve cryptosystem whose key length is 224 bits, can handle calculation processing with a calculated amount of about 1/7 as compared with a RSA system whose key length is 1024 bits. Thus, the elliptic curve cryptosystem was considered to be better-suited for an IC card, particularly a wireless IC card as the field of application using the elliptic curve cryptosystem. In the wireless IC card, the third party is capable of easily intercepting communication data and the wireless IC card cannot get by with avoiding encryption of the data. While the wireless IC card has the merit of being capable of passing through a gate with being non-contact, it must break a cipher and authenticate it during its short passage time. It is thus necessary to provide a reside computing device which efficiently executes a residue arithmetic operation or the like in the elliptic curve cryptosystem.

When it is desired to execute the residue arithmetic operation or the like, dedicated LSI or a processor equipped with a multiplier of about 32 bits performs calculations by, for example, a method of dividing a bit length of a long key every 32 bits and carrying out calculations. An algorithm for avoiding division by preference has been adopted for the calculations. This is a contrivance for reducing a chip size. As the above algorithm, it has been known that a calculation time interval becomes short if the Montgomery method, for example.

However, such a method using a multiplier having a less number of bits has many problems. The method is accompanied by a drawback that since a complex algorithm is used, the amount of calculations increases, and a clock should be unavoidably made fast from the need for the calculations in a short period of time, thereby increasing current consumption. Further, since data being in the course of their calculations must be stored in their corresponding registers or the like and a number of the registers are used, the amount of circuitry cannot be reduced so far.

An increase in current consumption will impose a restriction on a wireless IC card, particularly a wireless IC card of such a type that power is supplied in the form of external electromagnetic waves. An increase in the size of a chip will raise the cost of wireless IC cards supplied in large quantities.

SUMMARY OF THE INVENTION

The present invention has been made to solve the foregoing problems and aims to provide a residue computing device on a Galois Field, which is operated on a relatively low speed clock and most suitable for an arithmetic operation and a power-residue arithmetic operation used in elliptic curve cryptography.

In order to achieve the above object, the present invention adopts a residue look-ahead or prefetch arithmetic operation or an algorithm (hereinafter called a "residue prefetch arithmetic operation") and employs a circuit configuration or the like for reducing the number of operation clocks.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 2 is a diagram illustrating a normal calculation-based process in FIG. 1;

FIG. 3 is a diagram showing a calculation Table according to the present invention shown in FIG. 1;

FIG. 6 is a diagram showing a calculation Table of products made every terms by a method of successive substitution;

FIG. 7 is a diagram illustrating a calculation Table of power residues of X;

FIG. 10 is a diagram showing the relationship of magnitude between a summed or added value SUM and the value of a modulo Z;

FIG. 11 is a diagram showing a specific calculation example of a residue arithmetic operation;

DETAILED DESCRIPTION OF THE PREFERRED EMBODIMENT

Figure 1:
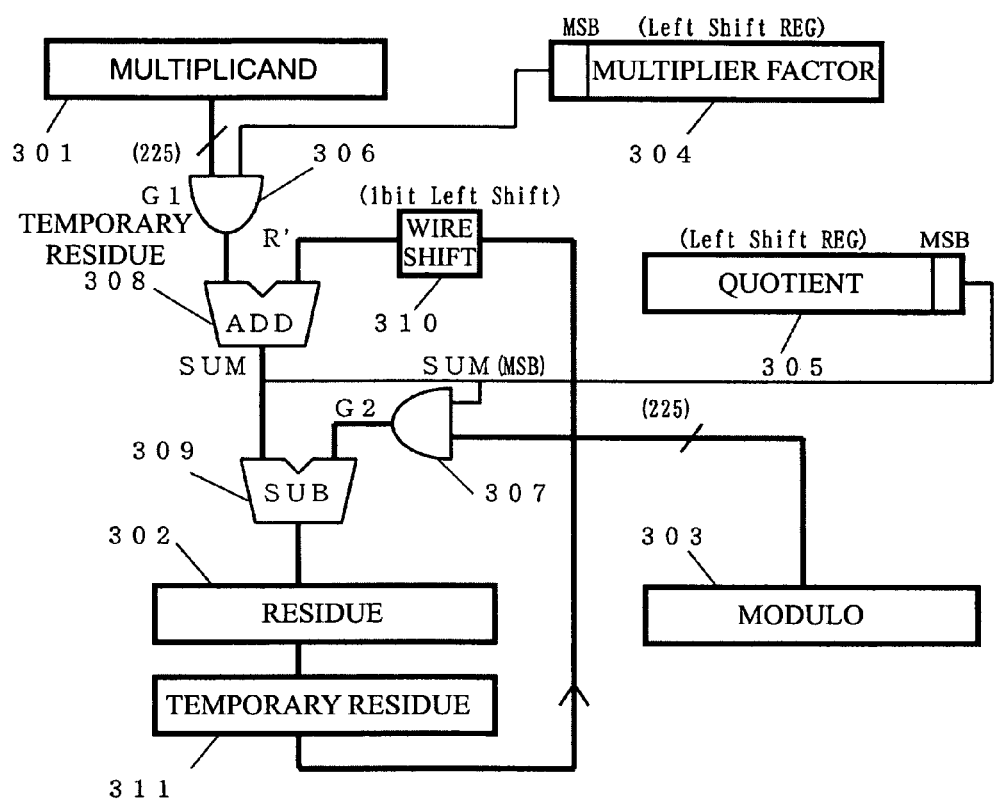
FIG. 1 is a principle diagram showing a residue prefetch arithmetic operation of a residue computing device according to a first embodiment.

Preferred embodiments of the present invention will hereinafter be described in detail with reference to the accompanying drawings. The base of a first embodiment according to the present invention will first be described. FIG. 1 is a principle diagram showing a residue look-ahead or prefetch arithmetic operation of a residue computing unit or device on a Galois Field $GF(2^m)$ with an mth irreducible polynomial as a modulo. When m=224 in FIG. 1, registers X(301), R(302), Z(303) and TP(311) respectively have a register length of 224+1 bit. Similarly, registers Y(304) and S(305) are respectively 224+1 bit left-shift registers similarly. A gate G1(306) is an AND gate for allowing data on a 225-bit bus to pass therethrough as it is when a control signal is given as 1 and bringing all of the data on the 225-bit bus to 0 when the control signal is given as 0. The gate G1(306) actually comprises 225 2-input AND gates. A gate G2(307) is similar to the above. An adder ADD(308) performs addition of data of 225 bits to one another. Since it is not necessary to take into consideration a carry upon arithmetic operation on the Galois Field GF ($2^m$) in practice, the adder ADD(308) can comprise 225 2-input EXOR elements. A subtractor SUB(309) performs subtraction of data of 225-bits from one another. Since it is not necessary to take borrow into consideration even in this case, the subtractor SUB(309) can be rendered perfectly identical in configuration to the adder ADD(308). A wire shift circuit T(310) is used to increment or raise an order by one according to a change in wire connection. Thus, the wire shift circuit T(310) does not serve as a circuit in terms of its contents. Incidentally, a temporary register TP is provided to hold a temporary residue produced upon a previous clock and prevent a linkage of arithmetic operations.

A description will next be made of in what way the circuit shown in FIG. 1 is operated. In FIG. 1, a residue arithmetic operation is effected on a multiplicand X and a multiplier factor Y under a modulo Z, so that a residue R and a quotient S can be determined. Namely, X·Y (modz) is calculated. Now, the residue prefetch arithmetic operation according to the present invention is started with fetching of a leading bit (MSB) of the register Y. If the leading bit is of 1, then the gate G1 adds the contents of X to the adder ADD as it is. However, if the leading bit is of 0, then the gate G1 adds 0 thereto. Since the register Y is of the left shift register, the addition of all bits in the register Y with a shift set for each bit will finally result in the calculation of the product of X and Y. However, the residue prefetch arithmetic operation according to the present invention differs from the normal arithmetic operation in that the modulo Z is subtracted for each addition referred to above. An added or summed value SUM is compared with the modulo Z. When the summed value SUM is equal to or larger than the modulo Z, an arithmetic operation for subtracting the modulo Z therefrom is performed. Namely, since a precondition for calculation resides in that the leading bit of the modulo Z is 1, the subtractor SUB subtracts the modulo Z from the summed value SUM through the gate G2 where the subtraction can be executed with MSB of the summed value SUM as 1. However, if MSB of the summed value SUM is 0, then its subtraction is not carried out. The reason why such subtraction is carried out, is to remove a multiple number of Z which does not contribute to a residue, in advance. It should be also noted that the removed multiple number of Z makes constant contribution to the quotient S. When a k(where k=0 , , , m−1)th bit of the register Y is being handled, the multiple number of Z results in $2^{(m-k)}$ times the modulo Z and the resultant value thereof is brought to LSB of the shift register S. In doing so, k finally becomes equal to m, i.e., k=m and hence the value of the shift register S means the quotient. This is done to take MSB of the summed value SUM in LSB of the shift register S as it is. The output of the subtractor SUB is brought to the residue register R as a temporary residue. When the kth bit of the register Y is being handled, the temporary residue means that the value of $2^{(m-k)}$ times thereof is of an actual residue. An initial value of the temporary residue is 0. This temporary residue needs to make digit alignment for the purpose of the next arithmetic operation. When one clock is advanced and the following lower bit of the register Y is calculated, an arithmetic operation for precedently adding a residue thereto in advance is carried out. This is an actual meaning that the adder ADD exists. The residue prefetch arithmetic operation according to the present invention is characterized in that the temporary residue left in the previous arithmetic operation is added in advance before the next subtraction. Upon its addition, the wire shift circuit T effects digit alignment with the next digit. It is of importance that since the wire shift circuit T actually performs only the change in wire connection, it does not depend on a clock at all. This fact makes it useful in shortening a clock necessary for calculations later.

Simple calculations will be illustrated by way example to achieve the understanding of the operation of the circuit shown in FIG. 1. This example is a case in which when an order m in an irreducible polynomial=5, elements on GF($2^5$) can be represented in vectors of 6 bits.

When X=$T^3$+T+1, Y=$T^4$+$T^3$+$T^2$+1 and Z=$T^5$+$T^2$+1, X=(001011), Y=(011101) and Z=(100101) and a quintic polynomial expression are represented in vectors, and X·Y (modZ), i.e., (001011)·(011101){mod(100101)} is calculated.

Since the product of the left side is determined and a division process is executed upon the normal calculation, the number of calculations is twelve. A simple calculation needs an approximately double register length 11 bits. The manner of such a calculation is illustrated in FIG. 2. From this calculation, the quotient results in (000110) and the residue results in (010001).

The residue computing device of FIG. 1 according to the present invention performs calculations in the following manner. Now look at the leading bit of Y.

① Since a first Y=0, the input to ADD takes (000000) and R assumes an initial value (000000). Therefore, R takes (000000) even after its shift, and its sum SUM eventually results in (000000). MSB of SUM is 0 and hence the subtraction of SUB is not carried out. Thus, a new R also results in (000000).

② Since the leading bit of a second Y is given as Y=1, the input to ADD takes (001011) and R still remains (000000). Therefore, a sum SUM takes (001011) and MSB of SUM takes 0. Thus, since the subtraction of SUB is not carried out, the value of R is updated to (001011).

③ Since the leading bit of a third Y is also given as Y=1, the input to ADD takes (001011) and R takes (001011) this time. However, it is one-bit shifted and the two are added together.

$SUM$=(001011)+(010110)=(011101)

MSB of SUM is 0 and hence the subtraction of SUB is not performed. Therefore, the value of R is updated to R=(011101).

④ The leading bit of a fourth Y is given as Y=1 and let's consider one-bit shift similarly. As a result, $SUM$=(001011)+(111010)=(110001)

MSB of SUM results in 1 and the subtraction (identical to the addition on GF($2^m$)) of SUB is executed. Thus, $R$=(110001)+(100101) (010100)

⑤ The leading bit of a fifth Y is given as Y=0, the input to ADD takes (000000), and a value obtained by shifting R by one bit results in (101000).

$SUM$=(000000)+(101000)=(101000)

MSB of SUM is 1 this time and the subtraction thereof from a modulo Z is carried out by SUB.

$R$=(101000)+(100101)=(001101)

⑥ The leading bit of a sixth Y is given as Y=1, the input to ADD takes (001011) and the sum of the input and a value obtained after one-bit shifting of R is as follows:

SUM=(001011)+(011010)=(010001)

Since MSB of SUM is 0, the subtraction of SUB is not executed and the post-updating R is represented as R=(010001).

The above calculations are shown in FIG. 3 as a calculation Table.

As a result, the residue R coincides with the normal calculation shown in FIG. 2. Incidentally, if MSB of SUM is taken in the shift register S, then the result thus taken becomes the quotient. This is because all of the multiple numbers of modulo Z are collected up. A portion surrounded by a frame of the calculation Table shown in FIG. 3 corresponds to the quotient S, i.e., S=(000110). This result also coincides with the normal calculation shown in FIG. 2.

Figure 4:
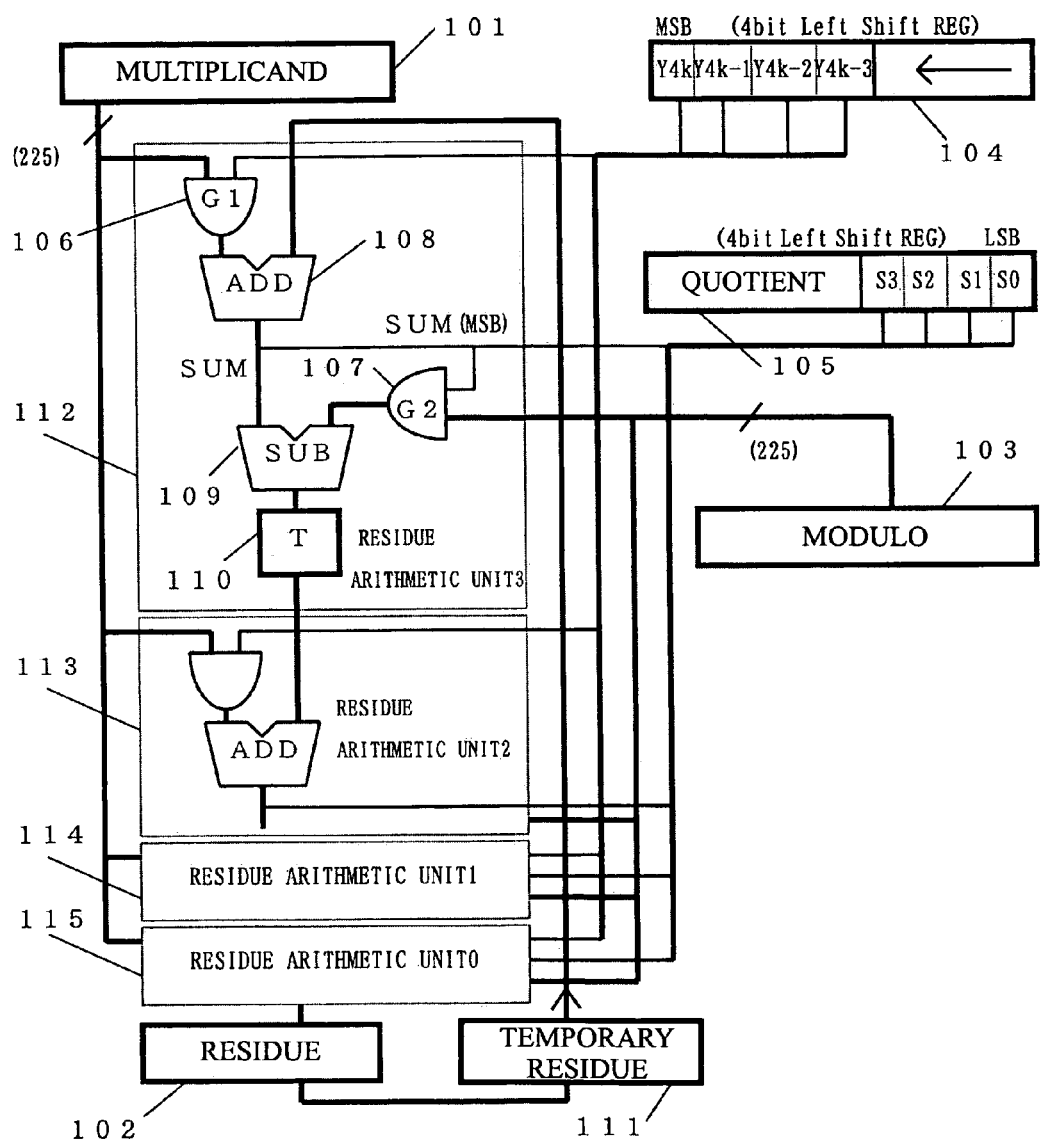
FIG. 4 is a circuit diagram showing the residue computing device shown in FIG. 1, which has been speeded up.

FIG. 4 illustrates the first embodiment according to the present invention and is a circuit wherein the residue computing device shown in FIG. 1 is speeded up by using a residue computing device on a Galois Field GF($2^m$). In FIG. 4, residue computing devices or units 3(112), 2(113), 1(114) and 0(115) each having the same circuit configuration are respectively equivalent to a core portion of the residue computing device shown in FIG. 1 and continuously connected in this order. The residue computing device shown in FIG. 4 takes a circuit configuration wherein 4 bits of a Y register (104) are collectively processed based on one clock. An X register (101), a Z register (103), and an R register (102) are identical in configuration to FIG. 1. However, the X register and the Z register are connected to all the residue computing devices or units. This is because they are used upon their arithmetic operations. The Y register (104) and an S register (105) are respectively 4-bit left shift registers herein. Namely, they collectively shift 4 bits according to one clock. Upper 4 bits of the Y register are respectively used as control inputs to AND gates (e.g., G1(106)) of the residue computing units 3 through 0. Lower 4 bits of the S register are respectively used to store control outputs from MSB of summed values SUM of the residue computing units 3 through 0 and result in inputs to AND gates (e.g., G2(107)).

The operation of the residue computing device of FIG. 4 corresponding to the first embodiment according to the present invention will now be described in brief. Each of the residue computing devices or units performs exactly the same operation as the residue computing device shown in FIG. 3 herein. However, the residue computing units shown in FIG. 4 differ from the residue computing device in that the residue computing device of FIG. 1 performs a residue calculation of one stage alone and leaves its temporary residue to the next clock, whereas the residue computing units of FIG. 4 calculate residues continuously in four stages and thereafter leave their temporary residues to the next clock. Namely, the next-stage residue computing unit has a configuration wherein its post-calculation temporary residue is passed thereto after having passed through a one-bit wire shift circuit T. This is because digit alignment should be also done in each case. A temporary residue calculated continuously in four stages is stored in the R register. The temporary residue is stored in a temporary register TP upon the next clock and serves so as to prevent a linkage of arithmetic operations. It should be noted that since the one-bit wire shift circuits T do not depend on the clock at all when the temporary residues are calculated continuously in four stages according to one clock, the four-stage continuous calculation is enabled. Namely, generally speaking, the order is decremented one by one arithmetic operation and has no direct bearing on the clock. It is noted that advancing such a method of thinking allows execution of the residue arithmetic operation even if the clock is not provided at all. When the residue computing devices are set to an n stage and n-bit shift registers are adopted, the number of clocks thereof can be handled as 1/n. A computing time interval thereof becomes sufficiently short, but LSI increases in chip size correspondingly. Whether the number of the residue computing units increases to thereby shorten the computing time interval, reduce each pattern area of LSI, or give priority to a reduction in power consumption, is a design problem.

The calculation of the quotient by the computing units must be done in consideration of the fact that whether a contribution to the quotient is made, is determined according to whether the subtraction of the subtractor SUB in each residue computing unit is made, only a first order is lowered by a one-stage residue arithmetic operation, and consequently the degree of its contribution is reduced by ½ times. Thus, the S register is also made up of a shift register for performing a 4-bit shift, based on one clock in conformity to the 4-bit shift configuration of the Y register in FIG. 4.

Figure 5:
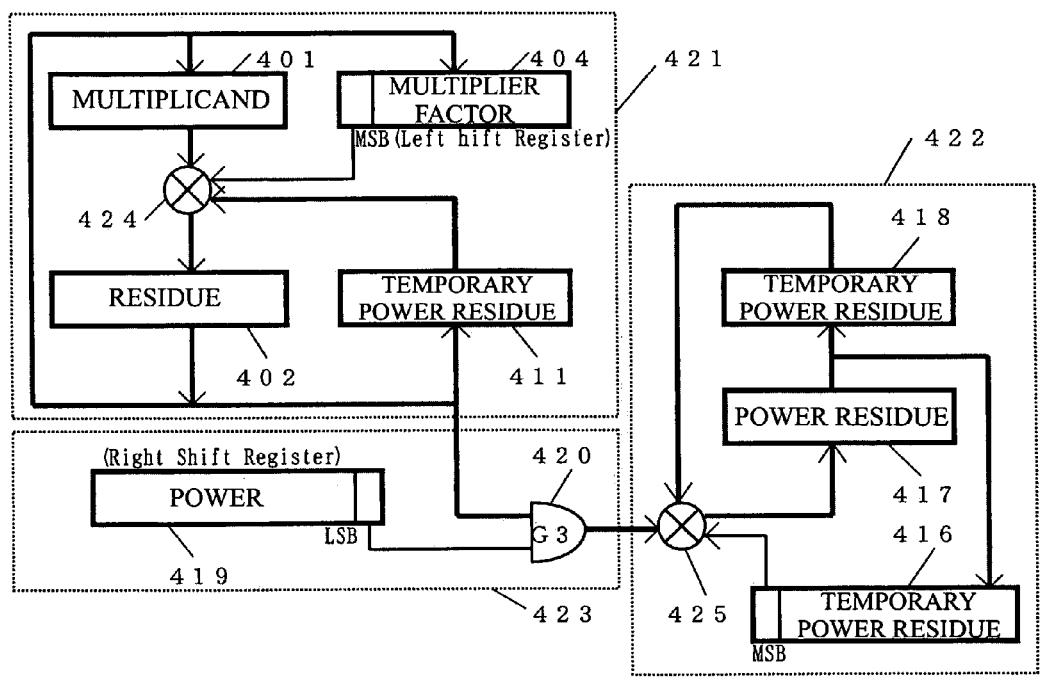
FIG. 5 is a principle diagram illustrating a power-residue arithmetic operation executed in a second embodiment.

FIG. 5 is the base of a second embodiment according to the present invention and is also a principle diagram showing a power-residue arithmetic operation on a Galois Field GF($2^m$). FIG. 5 mainly has three large configurations. The first thereof is a circuit for calculating the power (power of $2^k$) of an element X on a Galois Field GF($2^m$) through the use of a power residue computing unit (421). Thus, residues of $X^{(2^k)}$ (where k=0 , , , m−1) are calculated. The second thereof is a circuit for calculating a direct product of terms calculated by the power residue computing unit (421) through the use of a direct-product residue computing unit (422). When n is expressed as n=Σak·$2^k$ and in binary form, a residue of $X^{(\Sigma ak \cdot 2^k)}$ is thus calculated. The third thereof is a circuit for determining whether where n is expressed in binary form as described above, the direct product should be added according to the value of its bits, through the use of a register unit (423) for fixing up the number of power n.

The power residue computing unit (421) comprises a 225-bit x register (401), an RX^m register (402), a TP1 register (411), a Z register (omitted from the drawing), a Y register (404) corresponding to a left shift register and a residue computing unit (424) (having the same configuration as each of the residue computing units shown in FIG. 4). The power residue computing unit (421) is much different from the reside computing device shown in FIG. 1 in that a once-calculated residue RX^m is stored in the X and Y registers again and a residue corresponding to the product of values stored according to the subsequent clock is calculated. Namely, the power residue computing unit according to the present invention is characterized by having a circuit configuration for continuously calculating the product of each bit value and its own value to perform an arithmetic operation for incrementing or raising the order by the power of 2. First, the product of X and 1 is calculated, a residue of $X^2$ is then calculated based on the product of X and X, a residue of $X^4$ is further calculated based on the product of $X^2$ and $X^2$, and a residue of $X^8$, a residue of $X^{16}$, , , are subsequently calculated. This results in the calculation of residues of $X^{(2^k)}$ (where k=0 , , , m−1). Incidentally, since it is not necessary to calculate the quotient, there is no need to provide the S register shown in FIG. 1. Further, the representation of the Z register is omitted in FIG. 5.

The direct product residue computing unit (422) has a circuit configuration substantially identical to the residue computing unit shown in FIG. 1. A TP3 register (416), a TP2 register (417), and an RX^n register (418) correspond to the Y register (304), TP register (311) and R register (302) respectively. A residue computing device (425) also has the same configuration as each of the residue computing units shown in FIG. 4. A different point therebetween resides in that a temporary power residue of X in the course of calculation is stored in the TP3 register and a direct product is calculated. The temporary power residue of X at the calculation of the direct product is stored in the RX^n register and the final power residue of X^n is stored therein after the completion of its calculation. The register unit (423) for fixing up the number of power (or exponent) n comprises an n register (419) corresponding to a right shift register and a gate (420). When n is expressed as n=Σak·2^k and in binary form, it can be represented in vectors as n=(am−1, am−2 , , , a1, a0). If its bit is given as 1, then the direct product is calculated. If the bit is given as 0, then the direct product is not calculated or the product of X and 1 is calculated. When its computational process is at a stage in which X^(2^k) is being calculated, LSB of the n register (419) indicates the value of a kth bit and the value thereof controls whether the direct product at this stage should be added to the temporary power residue of X as a control signal for the gate (420). Calculating the direct product according to the value of the bit becomes equivalent to the calculation of a residue of X^n.

As an example of a simple arithmetic operation using the power residue computing device according to the present invention, a reverse or inverse element X^(−1) of the element X on a Galois Field GF(2^m) will be determined. The inverse element of the Galois Field GF(2^m) is to be originally determined from the original element X on a unique basis. Since the Galois Field is a finite field, the power of a given element X results in a residue 1 under a modulo Z. That is to say:

when $X^n \equiv 1 \pmod{Z}$ for $\exists n \in Z$

X^(n−1) can be set to the inverse element of X. The inverse element will first be calculated here by the normal method (method of successive substitution).

When $X = T^3 + T + 1$ vector representation (001011)
$Z = T^5 + T^2 + 1$ vector representation (100101), and
$Y = \Sigma b_k T^k$,
$X \cdot Y = \Sigma b_k (T^k \cdot X)$. Therefore, it can be represented in the following manner by use of Table of FIG. 6.

$$X \cdot Y = (00001)b4 + (10010)b3 + (01001)b2 +$$
$$(10110)b1 + (01011)b0$$
$$= 1$$

From the above, the next simultaneous linear equation is established using the fact that coefficients at terms having higher orders are 0.

b1+b3=0, b2+b0=0, b1=0, b3+b1+b0=0, b4+b2+b0=1

Consequently, b4=1, b0=b1=b2=b3=0

∴ Y=T^4

Actually, $X \cdot Y = (T^3+T+1) \cdot T^4 = (T^2+1) \cdot Z + 1 \equiv 1 \pmod{Z}$ This calculation is equivalent to the determination of the solution of the simultaneous linear equation, i.e., the calculation of an inverse matrix with a matrix calculation. Thus, it is necessary to obtain an inverse matrix of 224 bits. This is not a real calculation method.

The above result will next be verified by a manual calculation. This calculation is shown in a calculation Table of FIG. 7. According to it, since raising X to the 31st power yields a residue 1, the inverse element of X is equal to X to the 30th power, and its residue results in (10000). This means that Y=T^4, and is a result that coincides with the method of successive substitution.

According to the theory of the Galois Field, the digit number of a Galois Field GF(p^m) is p^m−1, and X^(p^m−1)=1 is established with respect to its element X. Substituting p=2 and m=5 therein yields X^(31)=1, which also coincides with the above calculation. Meanwhile, 31=2^4+2^3+2^2+2+1 in general in the case of 2^m−1=2^(m−1)+2^(m−2)+ . . . +2+1 and m=5. This is given as (011111) in vector representation. There have been provided a number of ideas for efficiently calculating the power of X from the regularity of such bits to thereby improve a computing speed of the inverse element. In the present invention, the residue of the inverse element of X can be calculated using directly the above power residue computing device as n=(011110) without depending on such ideas. Temporary residues that appear in its calculation process become just the same result as the calculation Table of FIG. 7.

Figure 8:
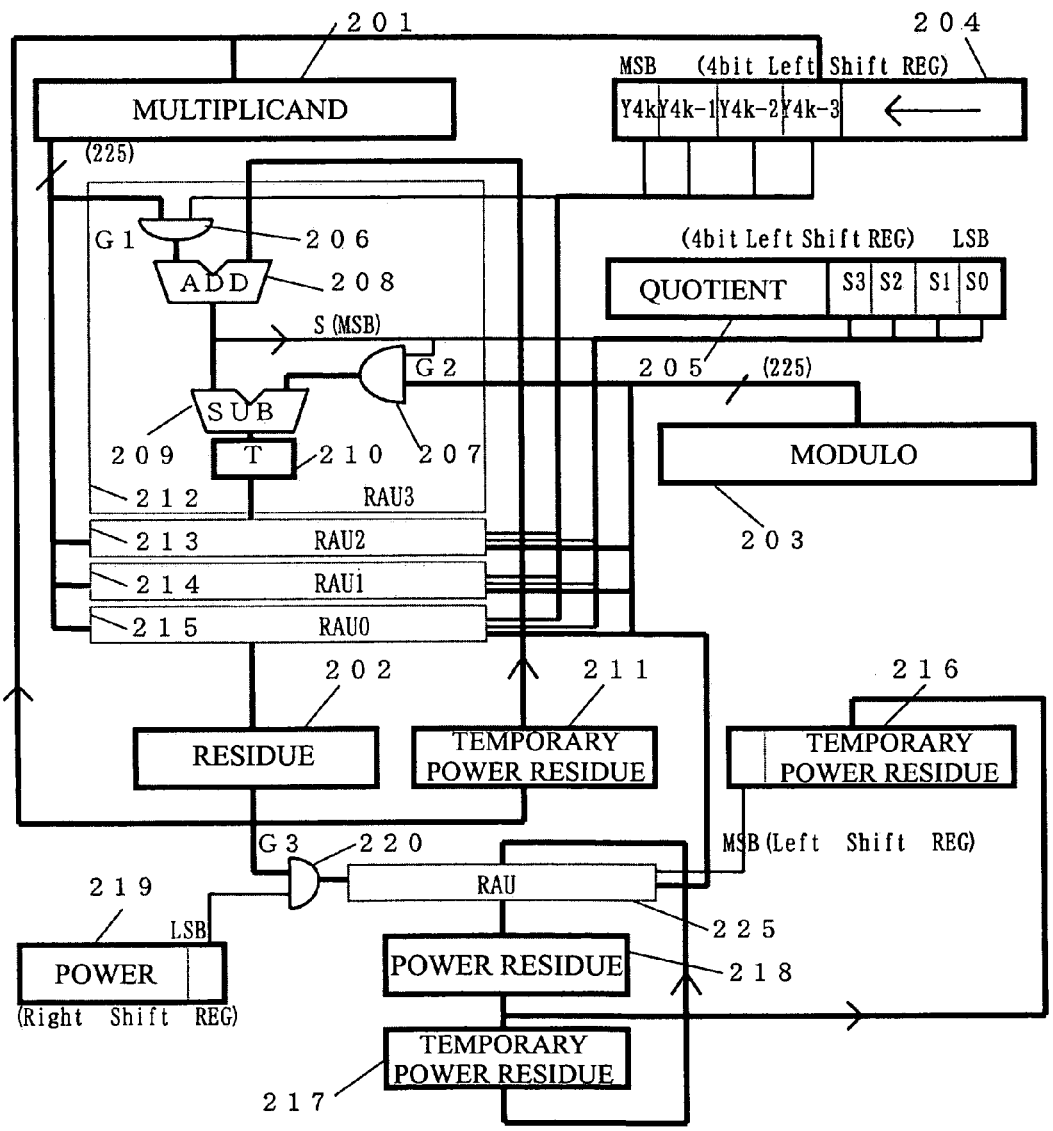
FIG. 8 is a circuit diagram showing a power residue computing device shown in FIG. 5, which has been speeded up.

FIG. 8 illustrates the second embodiment according to the present invention and is a circuit wherein the power residue computing device shown in FIG. 5 is speeded up by using a power residue computing device on a Galois Field GF(2^m). In order to reduce the number of clocks necessary for calculations to ¼ as compared with FIG. 4, such a configuration that residue computing devices or units are continuously connected sequentially in four stages, is adopted. Means for reaching the speeding up is identical to FIG. 4. An X register (201), a Z register (203), an RX^m register (202), a TP1 register (211), a TP2 register (217) and an RXAn register (218) are respectively 225-bit registers. A Y register (204), an S register (205) and a TP3 register (216) are respectively 4-bit left shift registers of 225 bits. An n register (296) is a 4-bit right shift register of 225 bits. A gate G3(220) is identical to a gate G1(206) or the like in configuration The residue computing unit (225) is also identical in configuration to the residue computing units 3 through 1 (212 through 215).

In the circuit shown in FIG. 8, the calculation of an inverse element of a given element X is equivalent to a case in which the number at which the bit of n is 1, is maximum and the amount of calculations is maximum. When m=224 and the 225-bit registers are used, 57 clocks are required to calculate a residue of the product of X and Y. In order to calculate a residue of the inverse element, clocks corresponding to 225 times thereof are required. When the residue computing units are continuously connected in n stages, (m+1)^2/n clocks are generally required.

A description will be made of what happens if the residue computing device proposed in the first embodiment of the present invention is expanded onto GF(p) other than GF(2^m). In this case, addition (ADD) and subtraction (SUB) having considered a carry must be executed. Since EXOR could treat with calculation processing on GF(2^m), it was not necessary to take the carry into consideration. Whether or not the subtraction should be executed, is judged by using a carry (borrow) and a comparator (for making a magnitude comparison between each summed value and Z) in place of SUM (MSB). 225-bit-to-225-bit arithmetic operations need to additionally calculate the carry (borrow)

at high speed. It will however be confirmed that how to take a circuit configuration can be handled in exactly the same fashion. Namely, the proposed circuit diagram has extremely high general versatility.

Figure 9:
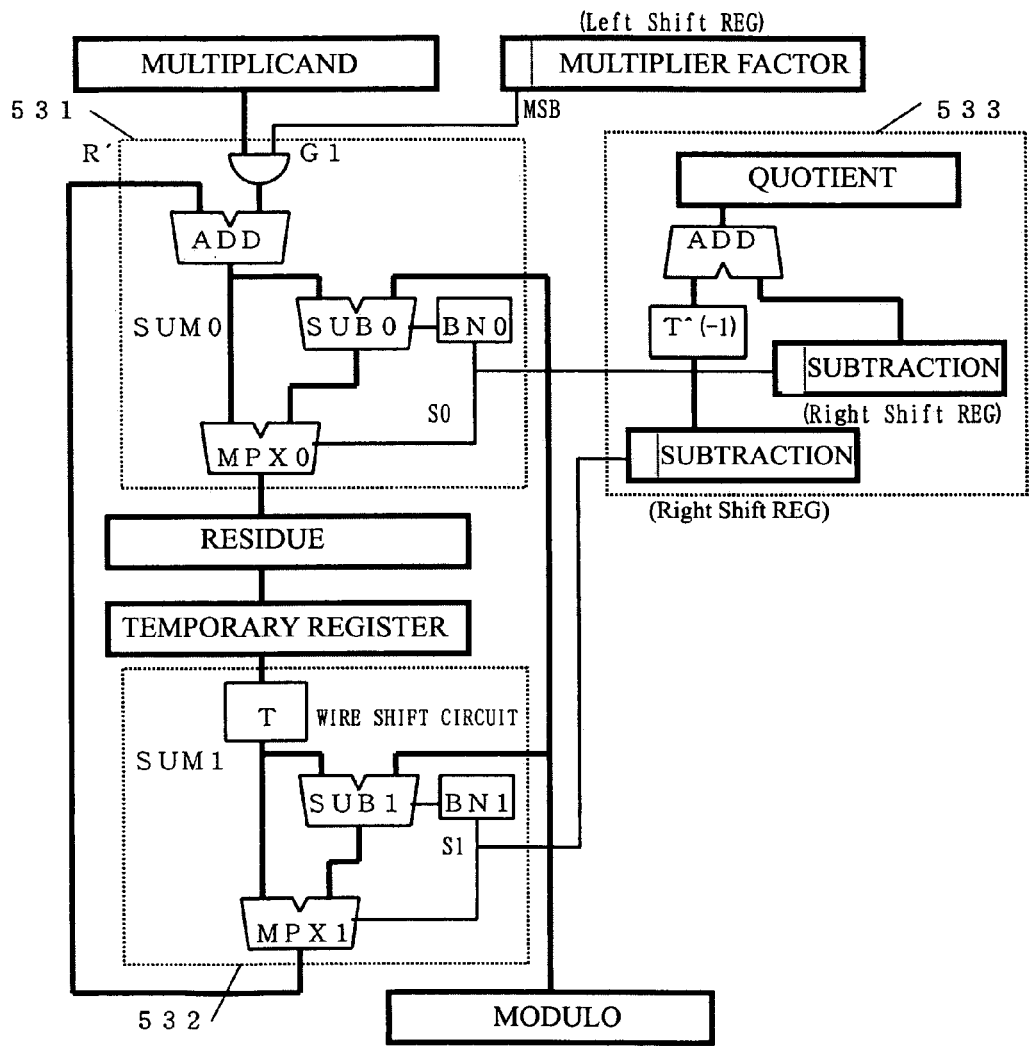
FIG. 9 is a principle diagram illustrating a power-residue arithmetic operation executed in a third embodiment.

FIG. 9 shows the base of a third embodiment of the present invention and is also a principle diagram at the time that a residue computing device on a GF(p) has adopted a residue prefetch arithmetic operation. The residue computing circuit shown in FIG. 9 can be roughly divided into three portions. The first portion thereof is a residue add circuit (531), which is a circuit for adding a temporary residue R' and a multiplicand X, comparing the result of addition SUM0 and a modulo Z and subtracting the modulo Z therefrom when SUM0 is greater than or equal to the modulo Z. The second portion thereof is a wire shift circuit (532), which is a circuit for subtracting a modulo Z from a value shifted by a wire shift T when the value is greater than or equal to the modulo Z. The third portion thereof is a quotient calculation circuit (533), which is a circuit for calculating a quotient for a modulo Z of a product X·Y using signals (S0 and S1) outputted as a result of subtraction.

The operation of the add circuit (531) is basically identical to GF($2^m$). Let's look at an upper bit (MSB) of Y first. If it is 1, then X is added (ADD) thereto, whereas if it is 0, no addition is executed. The other party for addition is a temporary residue R' and its initial value is 0. An added or summed value (SUM0) is compared with a modulo Z, and subtraction (SUB0) is executed only when the summed value is greater than or equal to the modulo Z as a result of its comparison. Such an arithmetic operation is executed to eliminate a part (multiple number of Z) non-contributive to a residue in advance and omit an excess or unnecessary arithmetic operation. Namely, when no borrow appears as a result of the subtraction of SUB0-Z, a flag (BN0) is set and the value thereof is latched. A signal (S0) outputted from the flag controls a multiplexer (MPX0). If the output signal (S0) thereof is of 0, then a summed value (SUM0) is selected as it is. If the output signal (S0) is of 1, then a subtracted value subsequent to the subtraction (SUB0) is selected and then stored in a residue register R. At the head of the next clock, the value of the residue register R is shifted to a temporary register TP. The temporary register TP is provided to prevent a linkage of arithmetic operations.

In the wire shift circuit (532), the value of the temporary register TP is shifted (T) by one bit, thus resulting in an intermediate temporary residue. This shift is done to make digit alignment for the preparation of the next addition. Here, the post-shift value is compared with a modulo Z, and subtraction (SUB1) is executed only when the value is greater than or equal to the modulo Z. This is because since a summed value (SUM) at the next calculation exceeds 2Z where the value becomes greater than Z owing to the shift, the above subtraction is done to prevent such exceeding. This calculation is carried out in exactly the same manner as in the reside add circuit. Namely, the subtract circuit SUB1, flag BN0 and multiplexer MPX0 correspond to SUB0, BN1 and MPX1 respectively. However, data to be handled are different from one another and used as an output (S1) produced from the flag BN1 and an output (temporary residue R') produced from the multiplexer MPX1. An arithmetic operation (ADD) for adding the temporary residue (R') in advance is carried out again at the next clock before the subtraction (SUB0). Incidentally, the quotient can be calculated from the results of comparison (S0 and S1). According to this calculation method, a final residue R is obtained after an m+1 clock with respect to the product of the values of m+1 bits.

The quotient calculation circuit (533) becomes slightly complex here. As to the output signal (S0) produced from the add circuit (531), when a k(where k=0 , , , m−1)th bit of a Y register is being handled, the multiple number of Z is $2^{(m-k)}$ times the Z, which in turn is taken in LSB of a right shift register SUB0. On the other hand, as to the output signal (S1) produced from the wire shift circuit (532), when the k(where k=0 , , , m−1)th bit of the Y register is being handled, the multiple number of Z is $2^{(m-k-1)}$ times the Z and a contribution thereof to the quotient S results in its half. Thus, the output signal (S1) is brought to LSB of the right shift register SUB1 and thereafter digit alignment is carried out by a wire one-bit right shift circuit $T^{(-1)}$, whereby the signal is added as a contribution to the quotient S. After all the multiple numbers of the modulo Z have been collected up, the sum thereof means the quotient S properly.

In what case the values subtracted by the subtractors (SUB0 and SUB1) should be selected by the multiplexers, is shown in Table of FIG. 10. This is a Table showing the relationship of magnitude between a value SUM added by an adder ADD and the value of a modulo Z. When the summed value or a post-wire shift value is equal to or greater than the modulo Z when the values are compared, the relationship in which the modulo Z is always subtracted from the summed value, is represented therein. Values 0 in Table indicate that no subtracted values are used, i.e., the multiplexers (MPX0 and MPX1) respectively select the subtracted values. Values 1 in Table indicate that the subtracted values are used, i.e., the multiplexers (MPX0 and MPX1) do not select the subtracted values respectively.

In order to obtain understanding as to how the residue arithmetic operations on the Galois Field GF(p) are carried out where the residue prefetch arithmetic operation according to the present invention is adopted, specific examples of calculations will be cited below.

A relationship between the respective parts in the above circuit will first be manifested.

$$SUM0 = R' + X \cdot Ymsb \quad (1)$$

where R' indicates a temporary residue from an upper or upward digit, and Ymsb indicates the most significant bit of the Y register.

$$R = SUM0 - S0 \cdot Z \quad (2)$$

where S0 indicates 1 when a value subtracted by SUB0 is selected or 0 when the value is not selected, i.e., each value stored in a subtracted value register SB0, which corresponds to SB0 in a calculation Table of FIG. 11.

$$R' = R \cdot 2 - S1 \cdot Z \quad (3)$$

where S1 indicates 1 when a value subtracted by SUB1 is selected or 0 when the value is not selected, i.e., each value stored in a subtracted value register SB1, which corresponds to SB1 in the calculation Table of FIG. 11.

$$S = SB0 + SB1/2 \quad (4)$$

The division of SB1 by 2 is done to make digit alignment. This corresponds to a wire one-bit left shift T.

Let's next consider how processing is advanced where X=17, Y=27 and Z=37. Vector representation of Y is given as (011011).

$$\text{0th clock: R'=0(initial value) and Ymsb=0} \quad (1)$$

Thus, SUMO=0+X·0=0. This corresponds to a mode ① of FIG. 10.

R=0−0·Z=0, and R'=0·2−0·Z=0

$$\text{1st clock: R'=0 and Ymsb=1} \quad (2)$$

Thus, SUMO=0+X·1=17. This corresponds to the mode ① of FIG. 10.

R=17−0·Z=17 and R'=17·2−0·Z=34

$$\text{2nd clock: R'=34 and Ymsb=1} \quad (3)$$

Thus, SUMO=34+X·1=51. This corresponds to a mode ③ of FIG. 10.

R=51−1·Z=14 and R'=14·2−0·Z=28

$$\text{3rd clock: R'=28 and Ymsb=0} \quad (4)$$

Thus, SUMO=28+X·0=28. This corresponds to the mode ② of FIG. 10.

R=28−0·Z=28 and R'=28·2−1·Z=19

$$\text{4th clock: R'=19 and Ymsb=1} \quad (5)$$

Thus, SUMO=19+X·1=36. This corresponds to the mode ② of FIG. 10.

R=36−0·Z=36 and R'=36·2−1·Z=35

$$\text{5th clock: R'=35 and Ymsb=1} \quad (6)$$

Thus, SUMO=35+X·1=52. This corresponds to the mode ③ of FIG. 10.

R=52−1·Z=15

The above processing was summarized in the calculation Table of FIG. 11.

$$\text{The calculation of the quotient } S: S=(001001)+ (00011x)/2 S=9+3=12 \ldots \text{quotient}$$

As a result, 17·27=459=12·37 . . . remainder 15 could be confirmed.

Figure 12:
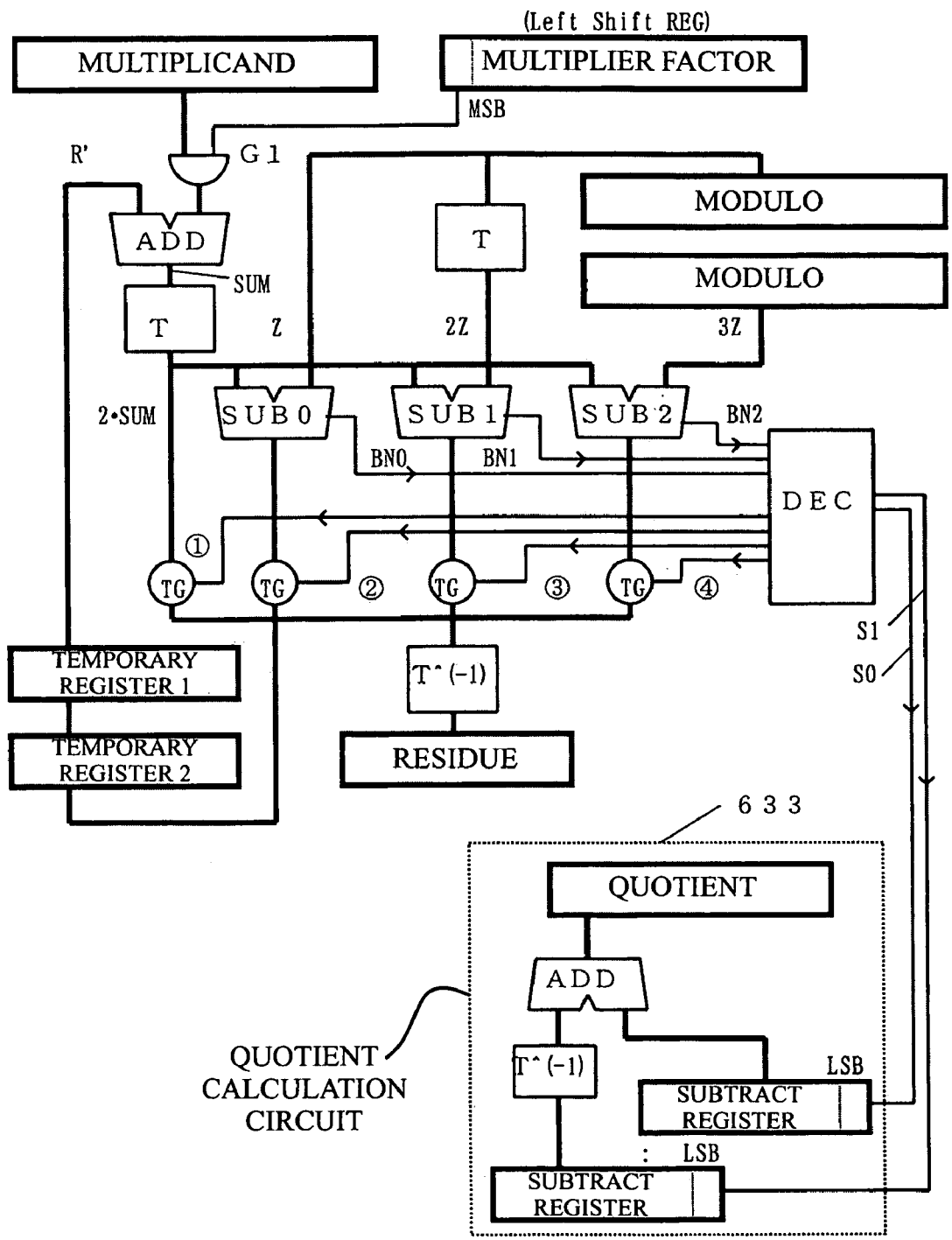
FIG. 12 is a circuit diagram illustrating a power residue computing device shown in FIG. 9, which has been speeded up.

FIG. 12 shows a third embodiment according to the present invention and is a circuit wherein the residue computing device on GF(p), which is shown in FIG. 9, has been speeded up. In the circuit shown in FIG. 9, the circuit configuration is adopted wherein the residue add circuit (531) and the wire shift circuit (532) are connected so as to perform calculations continuously. If consideration is given to the fact that delay times of the adders (ADD) and subtractors (SUB0 and SUB1) used for 225 bits-to-225 bits data are relatively long, then delays in their calculation times cannot be neglected. Thus, the third embodiment according to the present invention has adopted a configuration for integrally forming the residue add circuit (531) and the wire shift circuit (532) by considering the relationship of FIG. 10 in a developed form. Let's now consider a comparison between a value equal to twice a summed value (SUM) and a modulo Z and make comparisons with a value equal to twice the modulo Z and a value equal to three times the modulo Z so as to avoid appearance of a value equal to one-half the modulo Z upon its integration. This is because when the value equal to one-half the modulo Z is handled, the least significant bit thereof is neglected and hence their values do not add up upon their calculations. Therefore, the value 3Z must be calculated in advance even if the value 2Z could be implemented by the wire shift circuit. This calculation has a drawback in that while it is easy, the value must be stored in a Z' register before the calculation of a residue and hence its efforts will increase. However, if allowance is made for a chip area, then one adder is additionally provided and thereby the Z' register can be omitted.

Referring to FIG. 12, the value (2·SUM) equal to twice the summed value (SUM) is produced by its corresponding wire left shift circuit T. Further, the value (2·Z) equal to twice the modulo Z is also similar. The value (3·Z) equal to three times the modulo Z is calculated in advance as described above and stored in the Z' register. At this time, the results of subtraction executed by the subtractors SUB0, SUB1 and SUB2 were shown in FIG. 13. In this Table, the results of subtraction are divided according to cases with respect to variables BN2, BN1 and BN0 at the time that no borrow appears. Actually possible cases are limited to any of modes ①, ②, ③ and ④. When any of them is selected, a subtracted value in its mode, i.e., 2·SUM, 2·SUM−Z, 2·SUM−2·Z or 2·SUM−3·Z is stored in a temporary register TP2 as a temporary residue. The temporary register TP1 is separately provided to prevent a linkage of arithmetic operations by way of example. A final residue R is stored in its corresponding R register as a value subsequent to having passed through a wire right shift circuit T^(−1). This is a process for making a return to a digit being handled at present. This is carried out to restore the value set to twice by the wire left shift circuit T in advance to its original value. The calculation of a quotient S can be obtained by accurately evaluating a multiple number of Z where the subtraction is made under the modulo Z. A contribution to the quotient at the corresponding digit is equivalent to an integral multiple of Z/2. If its multiple number is expressed in binary form, then the values of their bits result in the values of S0 and S1 as they are. The values of S0 and S1 are brought to their corresponding LSBs of subtraction registers SB0 and SB1 in a quotient calculation circuit (633) as they are. The contribution to the quotient can be finally determined according to S=SB0+SB1/2 when S0 and S1 are set as follows:

$$S0=BN2\_BN1BN0+BN2BN1BN0 \quad (③ \text{ and } ④)$$

$$S1=BN2\_BN1\_BN0+BN2BN1BN0 \quad (② \text{ and } ④).$$

When the processing of a clock is finished and the necessary bits are stored in the subtraction register, the proper quotient is taken in the corresponding S register. This is because all of multiple numbers of the modulo Z have been collected up. The value of the subtraction register SO is allowed to pass through the wire one-bit right shift circuit T^(−1) at this time in order to restore the contribution to the quotient set to twice in advance to its original state.

When the circuit shown in FIG. 12 is compared with the circuit shown in FIG. 9, the latter has the adder corresponding to one stage, the subtractors corresponding to the two stages and the multiplexers corresponding to the two stages, whereas the former has the adder corresponding to one stage, the subtractors corresponding to one stage and the transmission gate corresponding to one stage. Therefore, the delay time is reduced to about half and the speeding up is definitely achieved. However, inconvenience of pre-calculation of 3Z or a burden on the addition of one adder is significantly suffered.

The residue computing device illustrated in the circuit diagram of FIG. 12 has many problems although it has been speeded up. The first problem resides in that the output of a carry becomes delayed due to the addition (ADD). When data of m=224 bits are added together, a considerable delay time will be produced even if a carry look ahead circuit is used. It is however apparent that a wait for the carry becomes earlier in time rather than an arithmetic operation based on division (e.g., 32-bits by 32-bits division) made to no purpose. Instead, power consumption might be reduced by a delayed clock. The second problem resides in that the currently proposed circuit is still high in redundancy and increases in the amount of circuitry or circuit space. According to a trial calculation, when the area of a chip brought into LSI is simply calculated, an area of about 7mm$^2$ is required under a CMOS 1.2 μm rule. It is however said that the area may preferably be 4 mm$^2$ or less to prevent break-down of the chip when an IC card is bent or folded. It is also necessary to reduce the whole amount of circuitry.

A method of reducing the area of the adder per se will now be considered preferentially from the above request. As a general method, may be considered, a method of increasing the number of clocks to reduce the circuit amount and using the same circuit many times. It is considered that, for example, 225-bit data are delimited every 32 bits and calculated eight times in parts by use of a 32-bit adder and the like without executing addition and subtraction of the 225-bit data as they are. If registers are also set as a configuration using a RAM, then the area is significantly reduced.

Figures 13, 14:
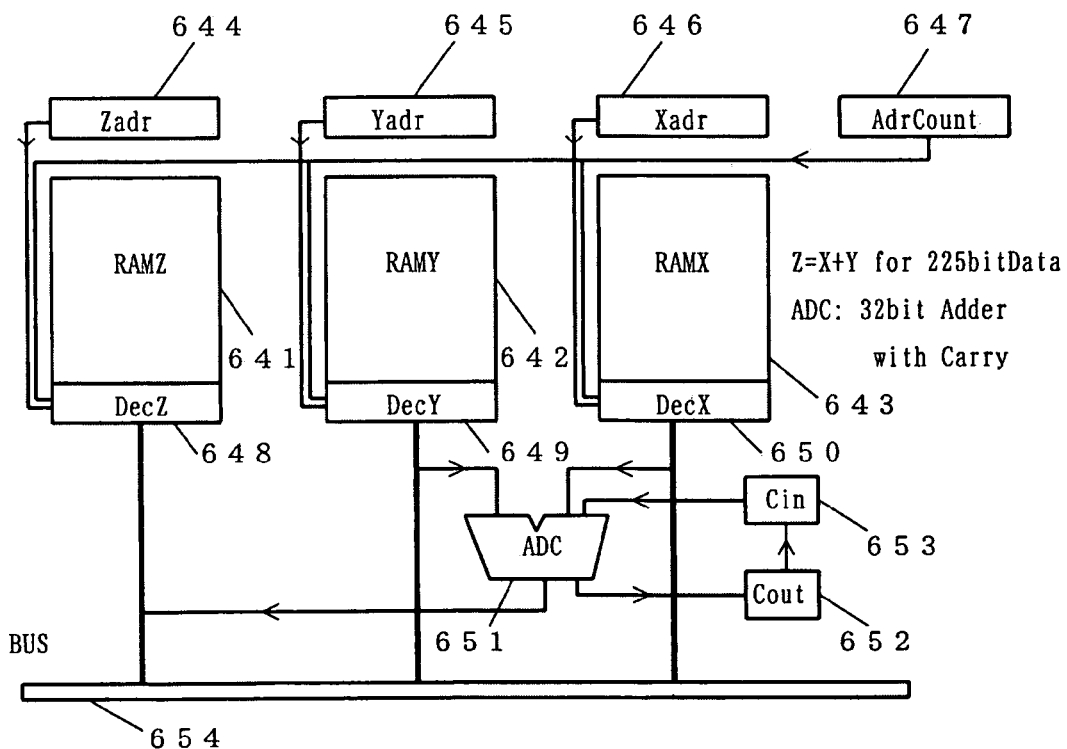
FIG. 13 is a diagram showing the result of subtraction by a subtractor shown in FIG. 12.
FIG. 14 is a circuit diagram for calculating $Z=X+Y$ for data X, Y and Z by use of an adder with a carry.

FIG. 14 shows a circuit for calculating Z=X+Y with respect to 225-bit data X, Y and Z by use of a 32-bit ADC (adder with a carry), which has been invented as such one example. In FIG. 14, the circuit includes a RAMZ (641), a RAMY (642) and a RAMX (643) each used as a RAM having a 32-bit configuration. They are respectively used to store the values of variables X, Y and Z. 32-bit registers Zadr (644), Yadr (645) and Xadr (646) are respectively used to designate or specify upper addresses of the RAMs. An AdrCount (647) is a 3-bit counter, which is used to specify lower addresses of the RAMs but is commonly used in all the RAMs. Since the counter is of 3 bits in the present example, it performs eight counts. The upper addresses and the lower addresses are combined together and inputted to their corresponding decoders DecX (648) DecY (649) and DecZ (650) of the RAMs. They are also used to store the values of the variables. The adder ADC (651) performs addition of 32-bit data together with a carry. In order to use the carry generated upon its addition for the purpose of the next calculation, the operation of inputting the value of a Count (652) to a Cin (653) must be carried out for each clock. Incidentally, it is noted that a change in mode as to whether each RAM should be brought to writing or reading, is made according to an instruction. A write signal (e.g., WR) and a read signal (e.g., RD) at this time are omitted. It is desirable to cause these RAMs to have general versatility and connect them to an internal bus BUS (654).

A circuit for a power residue computing device on a Galois Field GF(p) is essentially identical to the circuit configuration of FIG. 5. The present circuit is different therefrom only in that the residue computing device must perform an arithmetic operation that has taken into consideration a carry and borrow. A circuit configuration thereof is similar to one shown in FIG. 12.

The present invention adopts a residue prefetch arithmetic operation system. A residue computing device and a power residue computing device on a Galois Field GF(2^m) according to this system, and a residue computing device and a power residue computing device on a Galois Field GF(p) have been proposed respectively. The residue prefetch arithmetic operation system according to the present invention has a circuit configuration extremely high in general versatility as is apparent even from similarity of the above circuit group. Accordingly, the respective circuits can be shared in use by being switched by multiplexers or gates. For example, the power residue computing device (see FIG. 5) on the Galois Field GF(p) can share the use of other residue computing devices (see FIGS. 9 and 12) owing to addition of some gates. If it is considered that the adder or the like on the Galois Field GF(2^m) can be formed of EXOR, then the power residue computing device (see FIG. 5) can be also combined with the residue computing device and power residue computing device on the Calois Field GF(2^m). Since, however, they can be easily created and configured from the circuit of the present invention, a reference to them will be omitted in this detailed description.

In the present invention, the residue prefetch arithmetic operation system has been adopted, and the residue computing device and power residue computing device on the Galois Field GF(2^m) according to this system, and the residue computing device and power residue computing device on the Galois Field GF(p) could be proposed respectively. If emphasized repeatedly, then the residue prefetch arithmetic operation system according to the present invention can be made up of the circuit fundamental and extremely high in general versatility as is apparent from the similarity of the circuit group. Accordingly, the contrivance of other circuit configuration is easy to be built or incorporated therein. Further, the residue prefetch arithmetic operation system can be easily expanded to a residue arithmetic operation of elliptic curve cryptography, by extension, the field of application such as an IC card or the like. In terms of a function, the residue prefetch arithmetic operation system according to the present invention is particularly excellent in that the quotient can be directly determined. This means that the residue computing device according to the present invention shares the use of the function of a divider.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A residue computing device on a Galois Field GF(2^m), for calculating a residue R of a product of a multiplier factor X and a multiplicand Y under a modulo Z, comprising:
    a gate G1 for allowing the multiplier factor X to pass therethrough when a leading bit MSB of the multiplicand Y is 1;
    an adder ADD for adding a temporary residue R' and a value obtained by said passage to provide a summed value SUM;
    a gate G2 for allowing the modulo Z to pass therethrough when a leading bit MSB of the summed value SUM is 1; and
    a subtractor SUB for subtracting the modulo Z passed through the gate G2 from the summed value SUM, to provide a subtracted value,
    wherein a value obtained by shifting the subtracted value of the subtractor by one bit is set as the temporary residue R' for a next clock, wherein the shifting is repeatedly performed for each clock to thereby provide a subtracted value from the subtractor SUB as the residue R.

2. The residue computing device according to claim 1, wherein a leading bit MSB of the summed value SUM is provided to a shift register S that provides a quotient S based on the modulo Z of the product.

3. A residue computing device on a Galois Field GF(2^m), for calculating a residue R of a product of a multiplier factor X and a multiplicand Y under a modulo Z, comprising:
residue computing units each including
a gate G1 for allowing the multiplier factor X to pass therethrough when a leading bit MSB of the multiplicand Y is 1;
an adder ADD for adding a temporary residue R' and a value obtained by said passage to provide a summed value SUM;
a gate G2 for allowing the modulo Z to pass therethrough when a leading bit MSB of the summed value SUM is 1;
a subtractor SUB for subtracting the modulo Z passed through the gate G2 from the summed value SUM to provide a subtracted value; and
a one-bit wire shift circuit T;
wherein the residue computing units are continuously connected in N stages and the multiplicand Y is comprised of an N-bit shift register, and
wherein a value of a last residue computing unit is set as a temporary residue R' of a first residue computing unit for a next clock, wherein the setting is repeatedly performed for each clock to thereby provide a subtracted value from the subtractor SUB of the last residue computing unit as the residue R.

4. The residue computing device according to claim 3, wherein a leading bit MSB of the summed value SUM of each adder ADD is provided to an N-bit shift register S that provides a quotient S based on the modulo Z of the product.

5. A residue computing device on a Galois Field GF(2^m) or GF(p), for calculating a residue R of a power X^n of a multiplier factor X under a modulo Z, comprising:
a power residue computing unit for storing a temporary residue RX^m corresponding to an output of the residue computing device in first and second registers respectively for the multiplier factor X and a multiplicand Y, to thereby calculate and store the power of 2 of the multiplier factor X as the temporary residue;
a register unit, coupled to the power residue computing unit, for fixing a number of power n; and
a direct product residue computing unit, coupled to the register unit, for calculating a direct product of a plurality of results calculated by the power residue computing unit from a temporary residue RX^n corresponding to an output of the residue computing device.

6. A residue computing device on a Galois Field GF(p), for calculating a residue R of a product of a multiplier factor X and a multiplicand Y under a modulo Z, comprising:
a gate G1 for allowing the multiplier factor X to pass therethrough when a leading bit MSB of the multiplicand Y is 1;
an adder ADD for adding a temporary residue R' and a value obtained by said passage;

a subtractor SUB0 for subtracting the modulo Z from a summed value SUM0 of the adder ADD to provide a subtracted value;
a flag BN0 set to 1 when no borrow appears as a result of said subtraction by the subtractor SUB0;
a residue add circuit comprised of a multiplexer MPX0, for selecting the summed value SUM0 or the subtracted value responsive to a value of the flag BN0;
a circuit T for wire-shifting an output of the multiplexer MPX0 to provide a post-wireshift value SUM1;
a subtractor SUB1 for subtracting the modulo Z from the post-wireshift value SUM1 to provide another subtracted value;
a flag BN1 set to 1 when no borrow appears as a result of said subtraction by the subtractor SUB1; and
a wire shift circuit comprised of a multiplexer MPX1, for selecting the post-wireshift value SUM1 or the another subtracted value responsive to a value of the flag BN1,
wherein a process for setting a value output from the multiplexer MPX1 as the temporary residue R' according to a next clock is repeatedly executed for each clock to thereby calculate the residue R.

7. The residue computing device according to claim 6, wherein the value of the flag BN0 and the value of the flag BN1 are respectively provided to a subtracted value shift register SB0 and a subtracted value shift register SB1 every clock, and a value of the subtracted value shift register SB1 is shifted by one bit and added to a value of the subtracted value shift register SB0 to thereby calculate a quotient S based on the modulo Z of the product.

8. A residue computing device on a Galois Field GF(p), for calculating a residue R of a product of a multiplier factor X and a multiplicand Y under a modulo Z, comprising:
a gate for allowing the multiplier factor X to pass therethrough when a leading bit MSB of the multiplicand Y is 1;
an adder for adding a temporary residue R' and a value obtained by said passage to provide an added value;
a circuit for performing a wire shift for doubling the added value to provide a doubled value;
subtractors for respectively subtracting moduli Z, 2Z and 3Z from the doubled value; and
a decoder, having input thereto signals indicative of when borrows of the subtractors are not produced, for outputting signals for controlling transmission gates provided on output sides of the respective subtractors,
wherein a process for setting values output from each of said transmission gates as the temporary residue R' according to a next clock is repeatedly executed for each clock to thereby calculate the residue R.

9. The residue computing device according to claim 8, wherein a first output produced from the decoder and a second output produced from the decoder are respectively provided to a first subtracted value shift register and a second subtracted value shift register every clock, and a value of the first subtracted value shift register is shifted by one bit and added to a value of the second subtracted value shift register to thereby calculate a quotient S based on the modulo Z of the product.

* * * * *